Figure 6:
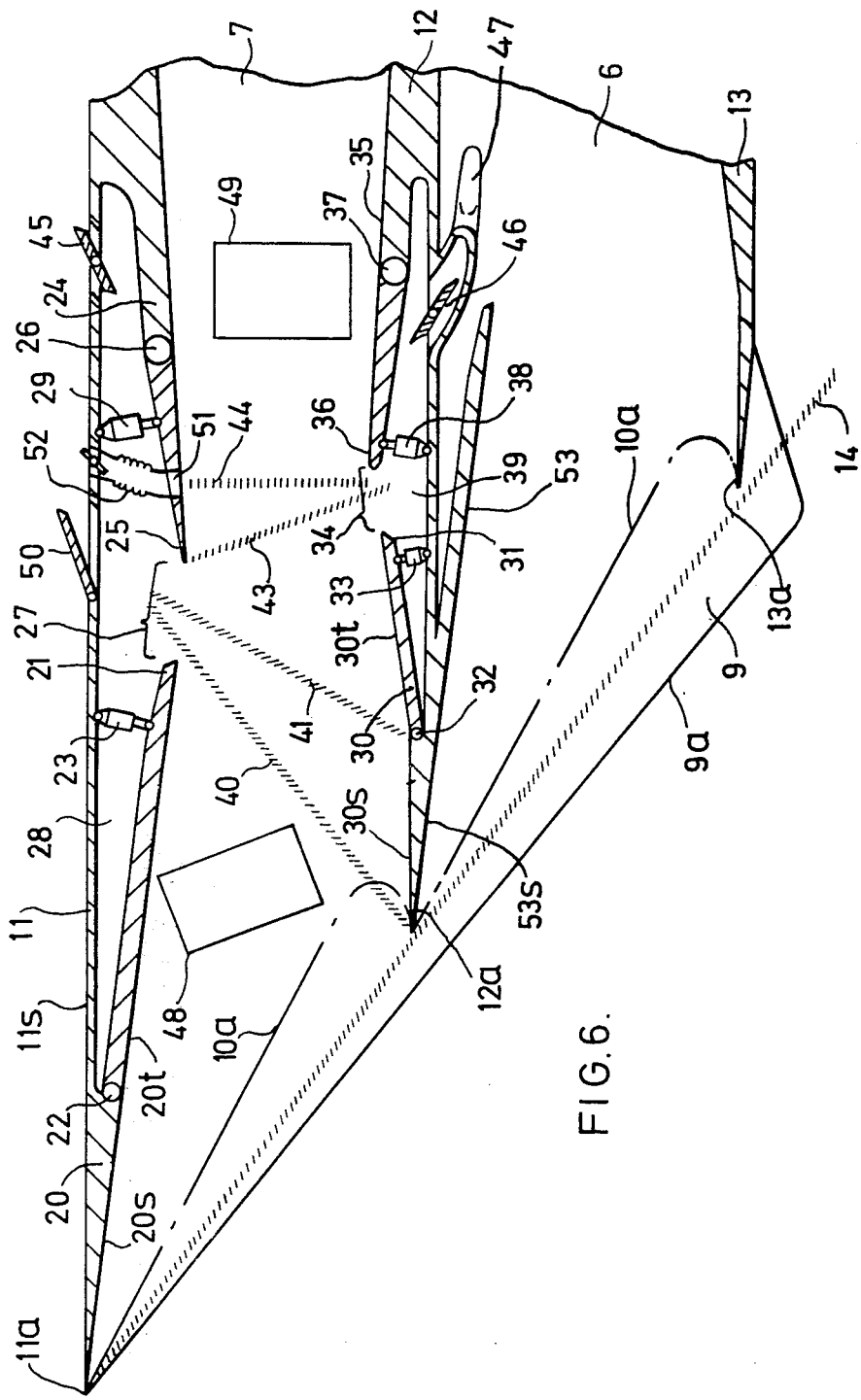

United States Patent [19]
Nangia

[11] 3,941,336
[45] Mar. 2, 1976

[54] AIRCRAFT AIR INTAKES
[75] Inventor: Rajendar Kumar Nangia, Bristol, England
[73] Assignee: British Aircraft Corporation Limited, London, England
[22] Filed: May 30, 1974
[21] Appl. No.: 474,856

[30] Foreign Application Priority Data
May 31, 1973 United Kingdom............... 26136/73
Nov. 15, 1973 United Kingdom............... 53123/73

[52] U.S. Cl. .............................. 244/53 B; 137/15.1
[51] Int. Cl.² .......................................... B64D 33/02
[58] Field of Search ............ 244/53 R, 53 B, 55, 15; 137/15.1, 15.2; 181/33 HA

[56] References Cited
UNITED STATES PATENTS
3,137,460  6/1964  Owl, Jr. et al. .................... 224/15 X
3,141,300  7/1964  Turcat ............................ 244/53 B X
3,186,661  6/1965  Denning et al. .................... 244/53 B
3,430,640  3/1969  Lennard ............................ 137/15.1

FOREIGN PATENTS OR APPLICATIONS
817,507  7/1959  United Kingdom.................. 244/15

Primary Examiner—Trygve M. Blix
Assistant Examiner—Barry L. Kelmachter
Attorney, Agent, or Firm—Cushman, Darby & Cushman

[57] ABSTRACT

A supersonic two-dimensional intake arrangement for two or more jet propulsion engines has a duct for each engine, a mouth region for each duct, said mouth regions being positioned in adjacent rearwardly staggered rearwardly such that at least one shock wave is common to all mouth regions. Preferably one duct wall is common to adjacent intake mouths.

6 Claims, 6 Drawing Figures

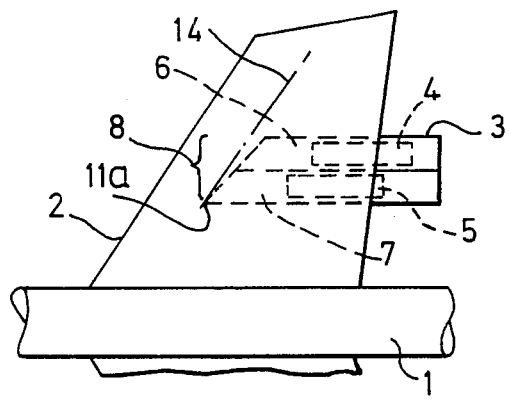
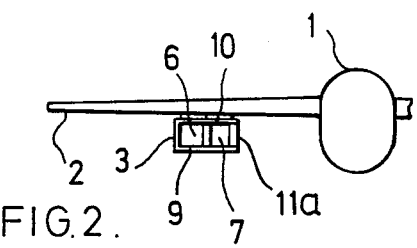
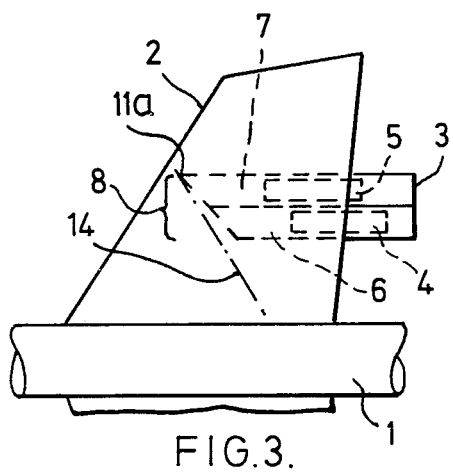
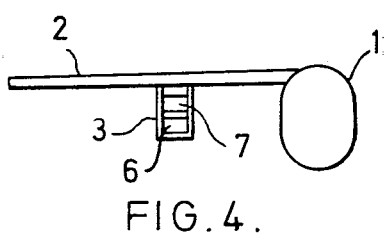
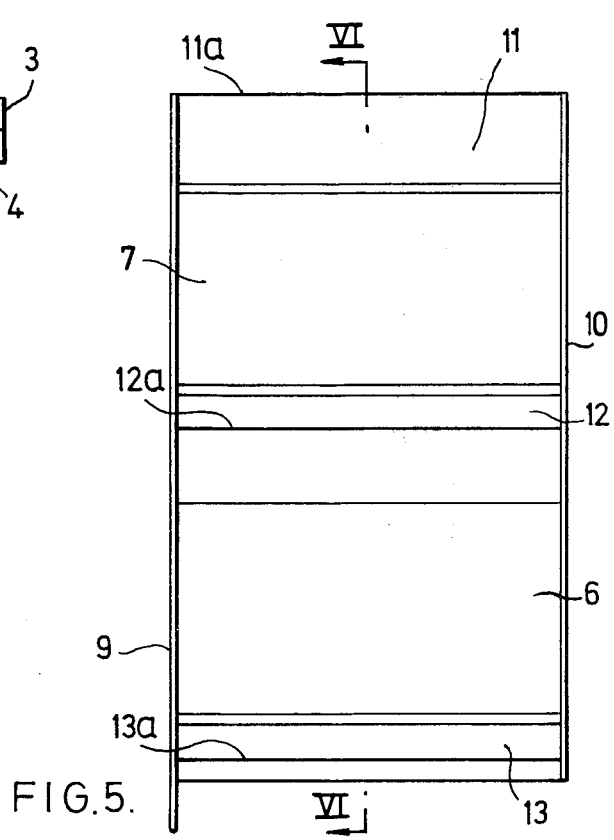

AIRCRAFT AIR INTAKES

This invention relates to air intake arrangements for the jet propulsion engines of multi-engined supersonic aircraft.

In supersonic aircraft, the air intake ducts are formed to produce shock waves which bring the speed of the intake air within the duct down to a sub-sonic level for delivery to an engine. In general, each intake duct for each engine has operated to produce its shock waves substantially independently of any other intake duct even when such ducts are positioned adjacent one another. Accordingly each intake duct has produced its own characteristic drag increment.

An object of the present invention is to provide an intake arrangement for at least two engines in which the total drag increment of the arrangement is less than that of the separate intake ducts it supercedes.

Each intake duct captures most of the air presented to it, but, inevitably, some is spilled over certain edges of the intake duct back into the free airstream. Where the intake ducts are operated substantially independently nearly all of this spillage is lost since it is not collected by other intakes.

A further object of the present invention is to provide an intake arrangement in which any spillage from one duct is at least partly collected by a further intake duct, and so on.

In this specification the term "Design Mach Number" is defined as that predetermined Mach Number for which the intake arrangement is designed to function efficiently.

These and other objects have been achieved in the preferred embodiments of this invention in which a supersonic two-dimensional air intake arrangement for at least two jet propulsion engines includes an intake duct for each engine, a forward facing mouth region for each duct, one mouth region, the leader mouth region, lying ahead of the other mouth regions, the follower mouth regions, in adjacent rearwardly staggered relationship, and shock wave forming means operative to generate at least one generally planar shock wave which, at least at the Design Mach Number of the intake arrangement, extends obliquely uninterruptedly across the said mouth regions of the intake arrangement.

It is also preferable that at least the leader intake mouth has a wall member with a forward leading edge including a first ramp member extending from said forward leading edge, a second ramp member spaced aft from said first ramp member on the same wall member, an opposite wall member having an aft leading edge positioned rearward of said forward leading edge and including a third ramp member positioned to the rear of said aft leading edge such that, at the Design Mach Number of the intake arrangement, generally planar shock waves generated by said aft leading edge and by said third ramp member extend obliquely across the duct to extend between the said first and second ramp members.

Some preferred embodiments of the invention are described with reference to the accompanying drawings.

In these drawings:

FIG. 1 is a part-plan view of an aircraft,
FIG. 2 is a part-front view of the aircraft of FIG. 1,
FIG. 3 is a part-plan view of a further aircraft
FIG. 4 is a part-front view of a further aircraft,
FIG. 5 is an enlarged front view of the engine intake arrangement of FIG. 3, and,
FIG. 6 is a sectional part-plan view of the intake arrangement, the section being taken on line VI—VI of FIG. 5.

Referring initially to FIGS. 1 and 2, an aircraft has a fuselage 1 and a wing 2 on which is carried a nacelle 3 housing two jet propulsion engines shown generally at 4 and 5 and mounted in staggered side-by-side relationship. The engines are fed by means of side-by-side ducts 6 and 7, respectively, which each have mouth regions formed within an intake arrangement shown generally at 8. Instead of lying close to the underside of the wing as shown in FIG. 2, the nacelle 3 may be spaced therefrom.

FIG. 3 illustrates a similar aircraft to that of the earlier Figures. The same reference numerals apply although the intake arrangement 8 is of opposite hand with the duct 6 being positioned inboard of the duct 7.

FIG. 4 illustrates yet a further aircraft in which the nacelle 3 houses the jet propulsion engines one above the other. These engines are fed by ducts 6 and 7 also mounted one above the other. Although not illustrated, the nacelles 3 may be mounted closely adjacent the fuselage 1 or in other positions along the wing or fuselage either with the ducts 6 and 7 side-by-side or one above the other. In each case the intake arrangements are generally similar and described with particular reference to FIGS. 5 and 6.

Referring now to FIGS. 5 and 6, the ducts 6 and 7 lie between two common, planar, parallel spaced wall members 9 and 10 respectively. Between these wall members, and lying perpendicular thereto, extend further wall members 11, 12 and 13 which have leading edges 11a, 12a, and 13a, respectively. The wall members 9, 10, and 11, 12 form the boundaries of the duct 7 and hence their forward ends also define the mouth region thereof. Similarly, the wall members 9, 10 and 12, 13 form the boundaries of the duct 6 and hence also define its mouth region.

The leading edge 11a is located further forward than the leading edges 12a and 13a so that at or near the Design Mach Number, it generates at least one generally planar shock wave 14 which extends obliquely rearwards over the full width of the intake arrangement.

The leading edges 12a and 13a are positioned to lie just behind the shock wave 14 so that this wave is not interrupted thereby. In effect the mouth regions of the ducts 6 and 7 are arranged in an adjacent rearwardly staggered relationship. The shock wave 14 is common to both ducts 6 and 7.

The leading edge of wall member 9, referenced 9a, is located forward of the shock wave 14, while that of wall member 10, referenced 10a and marked in broken outline in FIG. 6 lies rearward of the shock waves. In effect, the leading edges 11a, 12a, 13a and 9a 10a form the lips of the mouth regions of the intake arrangement.

In FIG. 1, the intake is arranged such that the mouth region of the outboard duct 6 is staggered rearwardly of the mouth region of the duct 7. In FIG. 3 the intake is arranged such that the mouth region of the inboard duct 6 is staggered rearwardly of the mouth region of the duct 7.

In FIG. 6, the interior of the intake duct 7 is shown in some detail. That of intake duct 6 is shown only in general; it may be substantially identical to that of duct 7 but it may be of a different, known type of design.

Referring now to the duct 7, the wall member 11 includes a first ramp member 20, whose leading edge is formed by the leading edge 11a. It has a trailing edge 21. The first ramp member 20 together with those ramp members to which reference is made later, extend across the duct 7 between the wall members 9 and 10. The ramp member 20 may present a fixed angle to the air flow but, alternatively, it may have a portion pivoted about a transverse axis to the fixed structure of the intake arrangement at 22 and its angular setting changed by means of a jack 23. Aft of the trailing edge 21 is a second ramp member 24 which has a leading edge 25. The leading edge 25 is spaced from the trailing edge 21 by a gap 27 which leads into a cavity 28. The ramp member 24 has a portion pivoted at 26 to the fixed intake structure about a transverse axis; its pivotal movement is controlled by a jack 29.

The wall member 12 includes a third ramp member 30 which is pivoted at its leading edge 32 about a transverse axis to the fixed structure. The ramp member 30 further has a trailing edge 31. It is controlled by a jack 33. Its leading edge lies directly to the rear of the leading edge 12a. Aft of the trailing edge 31, and spaced therefrom by a gap 34, is a fourth ramp member 35. This ramp member has a leading edge 36 and has a portion pivoted at 37 about a transverse axis to the fixed structure. Its movement is controlled by means of a jack 38. The gap 34 is in communication with a cavity 39.

At the Design Mach Number, a generally planar shock wave 40 extends obliquely upwards and rearwards across the intake duct from the leading edge 12a into the gap 27. A similar shock wave 41 also extends from the leading edge 32 of the ramp member 30 aft of the leading edge 12a and also extends into the gap 27. Also at the Design Mach Number, a shock wave 43 extends from the leading edge 25 of the ramp member 24 downwards across the intake duct into the gap 34. A further shock wave 44 extends from an intermediate region of the ramp member 34 across the duct also into the gap 34.

The cavity 28 is provided with a valve means 45 through which boundary layer air entering through the gap 27 can be discharged overboard. Similarly, the cavity 39 is provided with a valve means 46 through which boundary layer air entering through the gap 34 can be discharged overboard by way of a duct 47.

For an engine shut down case in flight, where air entering the intake duct cannot pass through the engine in quantity, dump doors, referenced 48, 49 and 50, are provided in the wall members of the intake duct. These are arranged, in known manner, to open automatically to atmosphere when an excess of air builds up in the intake duct during engine shut down, as before mentioned, or during transient build ups in normal operation.

A transversely extending aperture 51 is provided in the ramp member 24 in the region where the shock wave 44 originates. This aperture is connected to a valved flexible duct means 52 through which air entering the aperture 51 can be passed to atmosphere. The duct means 52 is flexibly formed so that any pivotal movement of the ramp member is accommodated.

Assuming a Design Mach Number of M = 2.0, the intake arrangement incorporated in duct 7 reduces the speed of the intake air to M = 0.90 in several stages; the shock wave 14 reduces it to about M = 1.7, the shock wave 40 reduces it to about M = 1.5, the shock wave 41 reduces it still further to about M = 1.1, and the final shock waves 43 and 44 reduce it to about M = 0.9.

To provide these Mach Numbers, the interior surface 20s of the fixed portion of the ramp member 20 lies at 7° included angle to the exterior wall 11s of the wall member 11 and the interior surface 20t of the movable portion lies at a similar angle. Similarly, the interior surface 30s of the wall 12, which forms a forward extension of the ramp member 30, lies parallel to the surface 11s whilst the interior surface 30t of the ramp member 30 itself lies at 9° to the surface 30s.

If the intake arrangement of duct 6 is the same as that of duct 7, that ramp member 53 corresponding to that referenced 20 has interior surface 53s set at an included angle of 7° to the surface 30s.

The ramp members 24 and 35 have their leading edges set somewhat inboard of the trailing edges of the ramps 20 and 30, respectively, so that boundary layer can readily flow into the respective cavities.

In the preferred embodiment described, the drag total of the intake arrangement is reduced compared with the sum of the drag increments of separate known intake ducts. Amongst others, the main reasons for this are that the wall member 12 is shared between the leader and the follower intakes so that one drag-producing surface is dispensed with, and the leading edges 11a, 12a and 13a have small included angles which present their adjacent surfaces at nil or relatively small angles to the approaching airstream. Additionally any air spillage from the leader mouth region over the leading edge 12a is collected by the next adjacent follower mouth region with a consequent improvement in intake efficiency over those types of spearate intake ducts where the spillage is lost to the free airstream.

I claim:

1. An air intake arrangement for at least two jet propulsion engines for a supersonic aircraft
the air intake arrangement comprising:
means defining a first intake duct, including four bounding sidewall means in two pairs of opposing sidewall means defining a first forward facing intake duct mouth region of generally rectangular shape;
means defining a second intake duct, including four bounding sidewall means in two pairs of opposing sidewall means defining a second forward facing intake duct mouth region of generally rectangular shape;
the intake ducts being arranged in side-by-side relation, with one of said bounding side wall means of each of said intake ducts being a bounding sidewall means shared in common therebetween;
said bounding sidewall means terminating forwardly at respective leading edges,
the leading edge of the bounding sidewall means of the first intake duct which opposes the shared in common bounding sidewall means leading the leading edge of the shared in common bounding sidewall means, and therefore constituting a forward leading edge,
the leading edge of the shared in common bounding sidewall means leading the leading edge of the bounding sidewall means of the second intake duct which opposes the shared in common bounding sidewall means, and therefore constituting an aft leading edge, said forward leading edge constituting shock wave forming means operative to generate at least one generally planar shock wave which, at least at the Design Mach Number of the air intake arrangement, extends obliquely and uninterruptedly across both the mouth region of the first intake duct and the mouth region of the second intake duct;

a first ramp member extending aft within the mouth region of the first intake duct from said forward leading edge;

a second ramp member extending aft within the mouth region of the first intake duct on the same sidewall means as the first ramp member, aft from the first ramp member;

a third ramp member extending aft within the mouth region of the first intake duct on said shared in common sidewall means from said shared in common leading edge;

the first, second and third ramp members being so spatially arranged that at the Design Mach Number of the intake arrangement, generally planar shock waves generated by said shared in common leading edge and said third ramp member extend obliquely across the first intake duct to lie between said first and second ramp members;

a fourth ramp member extending aft within the mouth region of the first intake duct on the shared in common sidewall means, aft from the third ramp member, the second, third and fourth ramp members being so spatially arranged that at the Design Mach Number of the intake arrangement, a generally planar shock wave generated by said second ramp member extends obliquely across the first intake duct to lie between said third and fourth ramp members; and pivot means respectively pivoting the second, third and fourth ramp members to the respective sidewall means on which they are provided, thereby permitting increasing and decreasing of angularity between the respective ramp members and sidewall means.

2. An air intake arrangement for at least two jet propulsion engines for a supersonic aircraft, the air intake arrangement comprising:

means defining a first intake duct, including four bounding sidewall means in two pairs of opposing sidewall means defining a first forward facing intake duct mouth region of generally rectangular shape; means defining a second intake duct, including four bounding sidewall means in two pairs of opposing sidewall means defining a second forward facing intake duct mouth region of generally rectangular shape;

the intake ducts being arranged in side-by-side relation, with one of said bounding side wall means of each of said intake ducts being a bounding side wall means shared in common therebetween;

said bounding sidewall means terminating forwardly at respective leading edges, the leading edge of the bounding sidewall means of the first intake duct which opposes the shared in common bounding side wall means leading the leading edge of the shared in common bounding sidewall means; and therefore constituting a forward leading edge, the leading edge of the shared in common bounding side wall means leading the leading edge of the bounding side wall means of the second intake duct which opposes the shared in common bounding side wall means and therefore constituting an aft leading edge, said forward leading edge constituting shock wave forming means operative to generate at least one generally planar shock wave which, at least at the Design Mach Number of the air intake arrangement, extends obliquely and uninterruptedly across both the mouth region of the first intake duct and the mouth region of the second intake duct;

a first ramp member extending aft within the mouth region of the first intake duct from said forward leading edge;

a second ramp member extending aft within the mouth region of the first intake duct on the same sidewall means as the first ramp member, aft from the first ramp member;

a third ramp member extending aft within the mouth region of the first intake duct on said shared in common sidewall means from said shared in common leading edge;

the first, second and third ramp members being so spatially arranged that at the Design Mach Number of the intake arrangement, generally planar shock waves generated by said shared in common leading edge and said third ramp member extend obliquely across the first intake duct to lie between said first and second ramp members;

a fourth ramp member extending aft within the mouth region of the first intake duct on the shared in common sidewall means, aft from the third ramp member, the second, third and fourth ramp members being so spatially arranged that at the Design Mach Number of the intake arrangement, a generally planar shock wave generated by said second ramp member extends obliquely across the first intake duct to lie between said third and fourth ramp members;

wherein the leading edge of the shared in common bounding sidewall means and the leading edge of the bounding sidewall means of the second intake duct which opposes the shared in common bounding sidewall means are located closely behind the obliquely extending, generally planar shock wave generated by said forward leading edge, at least at the Design Mach Number of the air intake arrangement; and pivot means respectively pivoting the second, third and fourth ramp members to the respective sidewall means on which they are provided, thereby permitting increasing and decreasing of angularity between the respective ramp members and sidewall means.

3. An air intake arrangement for at least two jet propulsion engines for a supersonic aircraft the air intake arrangement comprising:

means defining a first intake duct, including four sidewall means in two pairs of opposing sidewall means defining a first forward facing intake duct mouth region of generally rectangular shape;

means defining a second intake duct, including four bounding sidewall means in two pairs of opposing sidewall means defining a second forward facing intake duct mouth region of generally rectangular shape;

the intake ducts being arranged in side-by-side relation, with one of said bounding sidewall means of each of said intake ducts being a bounding sidewall means shared in common therebetween;
said bounding sidewall means terminating forwardly at respective leading edges,
the leading edge of the bounding sidewall means of the first intake duct which opposes the shared in common bounding sidewall means leading the leading edge of the shared in common bounding sidewall means, and therefore constituting a forward leading edge;
the leading edge of the shared in common bounding sidewall means leading the leading edge of the bounding sidewall means of the second intake duct which opposes the shared in common bounding sidewall means, and therefore constituting an aft leading edge,
said forward leading edge constituting shock wave forming means operative to generate at least one generally planar shock wave which, at least at the Design Mach Number of the air intake arrangement, extends obliquely and uninterruptedly across both the mouth region of the first intake duct and the mouth region of the second intake duct;
a first ramp member extending aft within the mouth region of the first intake duct from said forward leading edge;
a second ramp member extending aft within the mouth region of the first intake duct on the same sidewall means as the first ramp member, aft from the first ramp member;
a third ramp member extending aft within the mouth region of the first intake duct on said shared in common sidewall means from said shared in common leading edge;
the first, second and third ramp members being so spatially arranged that at the Design Mach Number of the intake arrangement, generally planar shock waves generated by said shared in common leading edge and said third ramp member extend obliquely across the first intake duct to lie between said first and second ramp members;
a fourth ramp member extending aft within the mouth region of the first intake duct on the shared in common sidewall means, aft from the third ramp member,
the second, third and fourth ramp members being so spatially arranged that at the Design Mach Number of the intake arrangement, a generally planar shock wave generated by said second ramp member extends obliquely across the first intake duct to lie between said third and fourth ramp members;
means defining a first cavity between the first and second ramp members, said first cavity communicating with the first intake duct and having an interior remote from the first intake duct;
first duct means for communicating the interior of the first cavity to the exterior of the intake arrangement;
means defining a second cavity between the second and third ramp members, said second cavity communicating with the first intake duct and having an interior remote from the first intake duct; and second duct means communicating the interior of the air intake arrangement.

4. The air intake arrangement of claim 3, wherein the leading edge of the shared in common bounding sidewall means and the leading edge of the bounding sidewall means of the second intake duct which opposes the shared in common bounding sidewall means are located closely behind the obliquely extending, generally planar shock wave generated by said forward leading edge, at least at the Design Mach Number of the air intake arrangement.

5. The air intake arrangement of claim 3, further including:
means on the second ramp member intermediate the forward to aft extent thereof, generating a further shock wave extending from intermediate the second ramp member, across the first intake duct to lie between the third and fourth ramp members.

6. The air intake arrangement of claim 5, wherein:
the second ramp member has means defining an aperture therein in the region where said further shock wave is generated; and
means providing a valved duct between said aperture and the exterior of the air intake arrangement.

* * * * *